US012783839B2

(12) United States Patent
Milli et al.

(10) Patent No.: US 12,783,839 B2
(45) Date of Patent: Nov. 3, 2026

(54) COMPUTER SYSTEM FOR MAKING LABELS, A METHOD FOR GENERATING LABELS ACTUATED USING A COMPUTER AND A COMPUTER PRODUCT

(71) Applicant: BUGNION S.P.A., Milan (IT)

(72) Inventors: Simone Milli, Bologna (IT); Luca Scipioni, Bologna (IT)

(73) Assignee: BUGNION S.P.A., Milan (IT)

(*) Notice: Subject to any disclaimer, the term of this patent is extended or adjusted under 35 U.S.C. 154(b) by 622 days.

(21) Appl. No.: 17/795,421

(22) PCT Filed: Feb. 18, 2021

(86) PCT No.: PCT/IB2021/051364
§ 371 (c)(1),
(2) Date: Jul. 26, 2022

(87) PCT Pub. No.: WO2021/165863
PCT Pub. Date: Aug. 26, 2021

(65) Prior Publication Data

US 2023/0058698 A1 Feb. 23, 2023

(30) Foreign Application Priority Data

Feb. 21, 2020 (IT) ........................ 102020000003644

(51) Int. Cl.
*G06K 19/06* (2006.01)

(52) U.S. Cl.
CPC .............................. *G06K 19/06037* (2013.01)

(58) Field of Classification Search
CPC ....... G06K 19/06009; G06K 19/06018; G06K 19/06028; G06K 19/06037; G06F 16/9554
See application file for complete search history.

(56) References Cited

U.S. PATENT DOCUMENTS

2002/0035571 A1* 3/2002 Coult ...................... G06F 16/40
707/999.005
2011/0066977 A1* 3/2011 DeLuca .............. G06F 16/9535
715/811

(Continued)

OTHER PUBLICATIONS

Jenni McKinnon, "Using the Wayback Machine to Archive (and Backup) WordPress", https://wpmudev.com/blog/archiving-with-wayback-machine/ (Year: 2017).*

(Continued)

*Primary Examiner* — Laura A Gudorf
(74) *Attorney, Agent, or Firm* — SHUTTLEWORTH & INGERSOLL, PLC; Timothy J. Klima

(57) ABSTRACT

A method actuated by an electronic processor having a network accessible user interface, includes: generating at least one "product" virtual entity; entering, using said user interface, first information associated with said "product" virtual entity and storing said first information; generating at least one "patent rights" virtual entity; entering, by means of said user interface, second information associated with said "intellectual property rights" virtual entity and storing said second information; establishing an association, via the user interface, between at least one "intellectual property rights" virtual entity and at least one "product" virtual entity and storing said association; generating an alphanumeric string defining a unique URL type Internet address for each "product" virtual entity; providing, as a result of an access to said URL type Internet address, at least a part of said second information regarding the "intellectual property rights" virtual entities stored in association with the above-mentioned "product" virtual entity.

34 Claims, 8 Drawing Sheets

(56) References Cited

U.S. PATENT DOCUMENTS

| | | | | |
|---|---|---|---|---|
| 2012/0055984 | A1 | 3/2012 | Van Megchelen | |
| 2012/0203901 | A1* | 8/2012 | Error | G06F 11/323 709/224 |
| 2014/0289675 | A1* | 9/2014 | Stading | G06F 16/3331 715/810 |

OTHER PUBLICATIONS

International Search Report and Written Opinion dated May 3, 2021 from counterpart International Patent Application No. PCT/IB2021/051364.

* cited by examiner

COMPUTER SYSTEM FOR MAKING LABELS, A METHOD FOR GENERATING LABELS ACTUATED USING A COMPUTER AND A COMPUTER PRODUCT

This application is the National Phase of International Application PCT/IB2021/051364 filed Feb. 18, 2021 which designated the U.S.

This application claims priority to Italian Patent Application No. 102020000003644 filed Feb. 21, 2020, which application is incorporated by reference herein.

TECHNICAL FIELD

This invention relates to a computerised labelling system, a virtual labelling method actuated by a computer and a computer product for implementing said method.

BACKGROUND ART

The practice is known of applying labels to products and/or relative packaging which bear the data regarding the patent rights, in particular the data which allows the identification of the patents protecting the product.

Normally, the data applied in these labels concern the reference numbers identifying the patents, as well as a wording which allows identification of the patent itself and its legal state (e.g. "patented" or "patent pending").

It is clear that, over time, the legal status of patents protecting the product can be modified (for example, "granted", "abandoned" or "refused"): in this case, the physical label applied to protect a particular product could bear information which is no longer truthful.

The label bearing non-truthful information could therefore lead to problems of a legal nature for the production and/or marketing company of the product, as information on the patents would be presented to third parties, in particular to competitors, which is not truthful.

In light of this, it is clear that in the event of modifications such that the contents of a label no longer correspond to the truth, the labels should be replaced on the products sold. This leads to considerable logistic costs for companies in order to replace the labels.

A strongly felt need in the sector in question is that of having a labelling system and a method which is particularly simple and which allows, very easily, the information on the labels to be kept updated in a particularly simple manner.

Another strongly felt need in the sector in question is that of having available a labelling system and a method which is particularly simple, and which allows the extremely fast production of labels regarding intellectual property rights.

DISCLOSURE OF THE INVENTION

The aim of the invention is therefore to overcome the above-mentioned drawbacks and to satisfy the above-mentioned requirements by providing a computerised labelling system, a labelling method actuated by a computer and a computer product.

BRIEF DESCRIPTION OF DRAWINGS

The technical features of the invention, with reference to the above aims, are clearly described in the annexed claims and its advantages are more apparent from the detailed description which follows, with reference to the accompanying drawings which illustrate an example, non-limiting embodiment of the invention and in which:

DETAILED DESCRIPTION OF PREFERRED EMBODIMENTS OF THE INVENTION

With reference to the accompanying drawings, the numeral 1 denotes a system SL (for virtual labelling) according to the invention.

Figure 1:
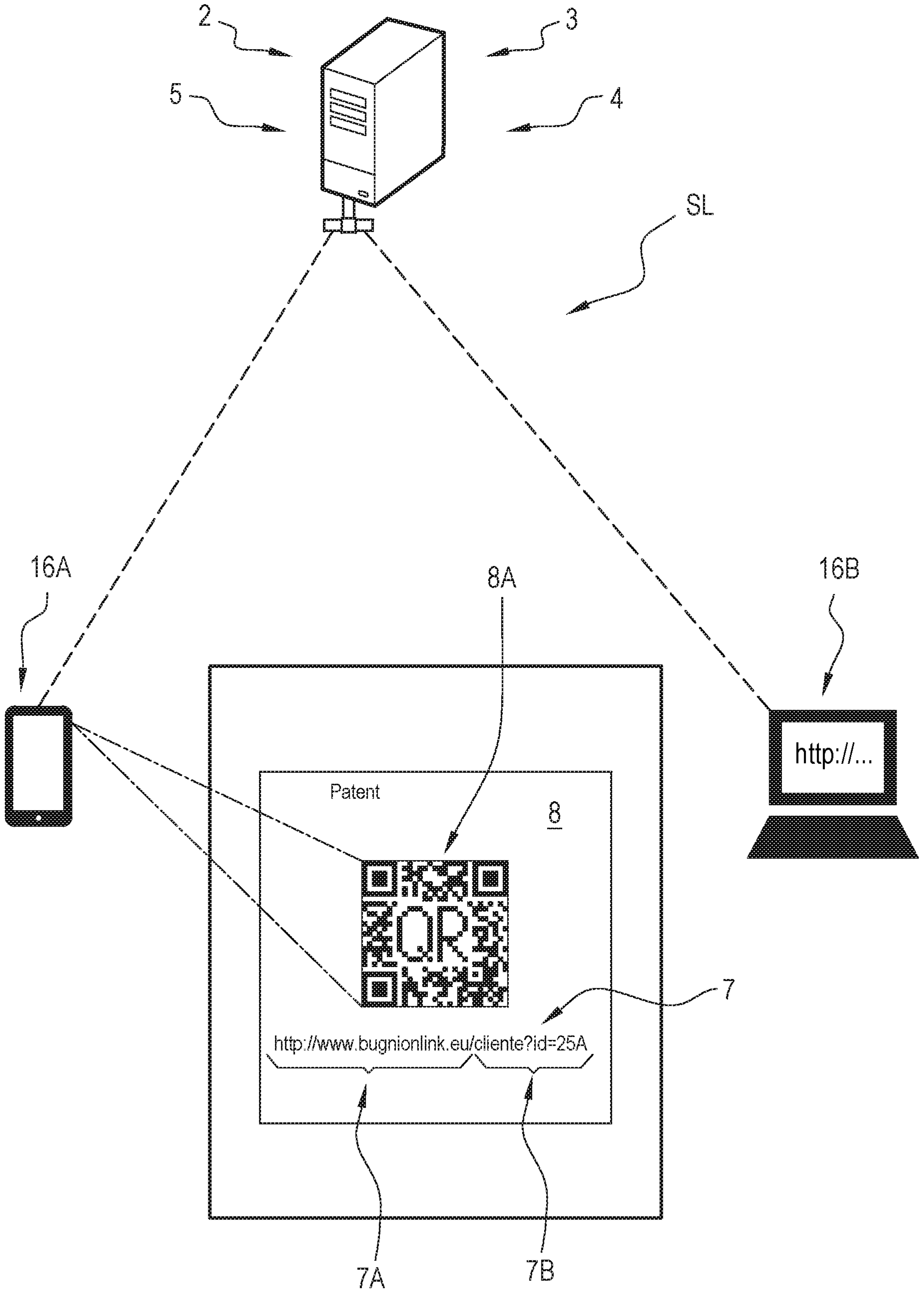
FIG. 1 is a schematic view of the system according to the invention.
Figure 2:
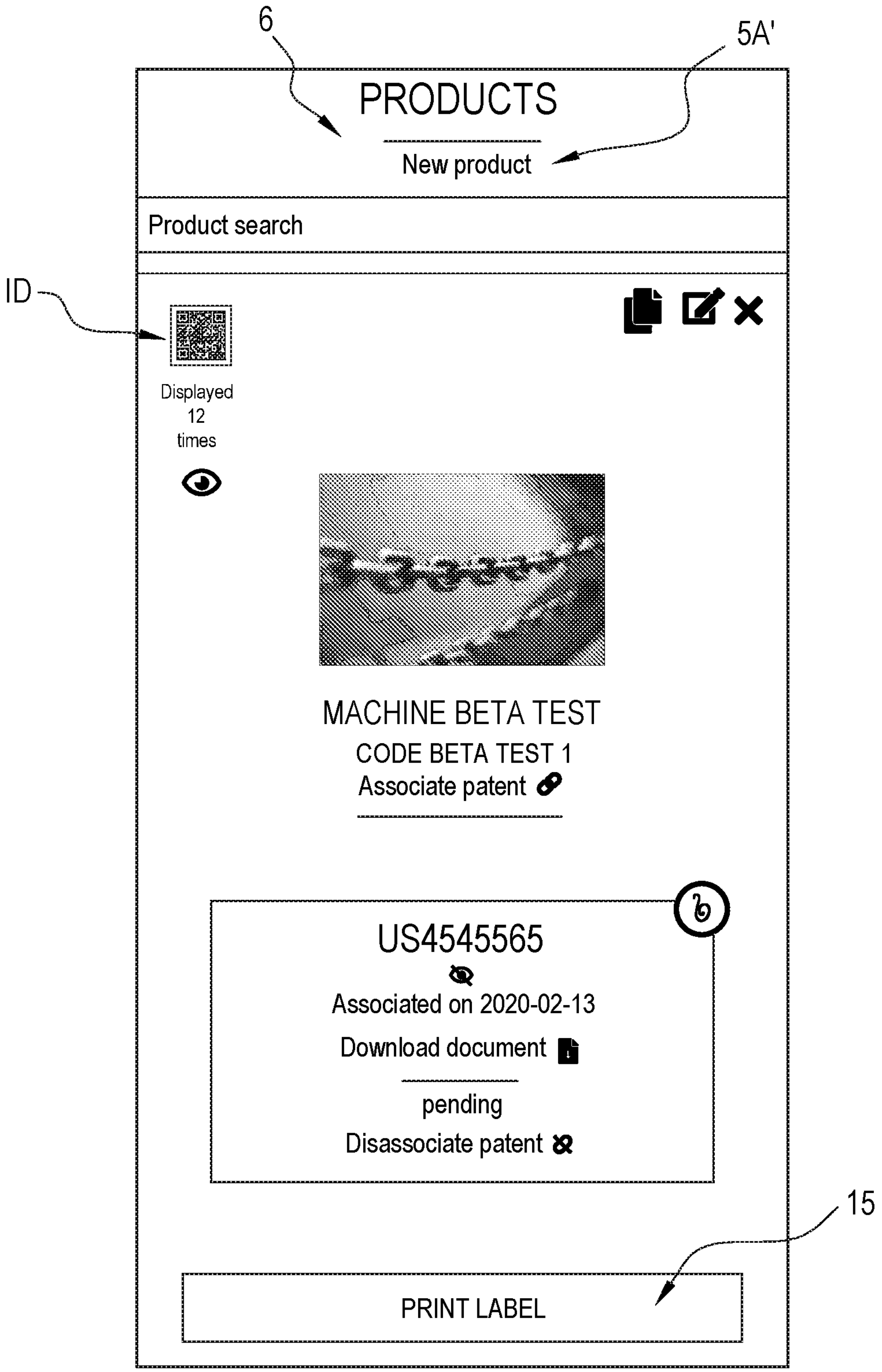
FIGS. 2 to 10 are respective schematic views of modules or interfaces constituting the system according to the invention.
Figure 3:
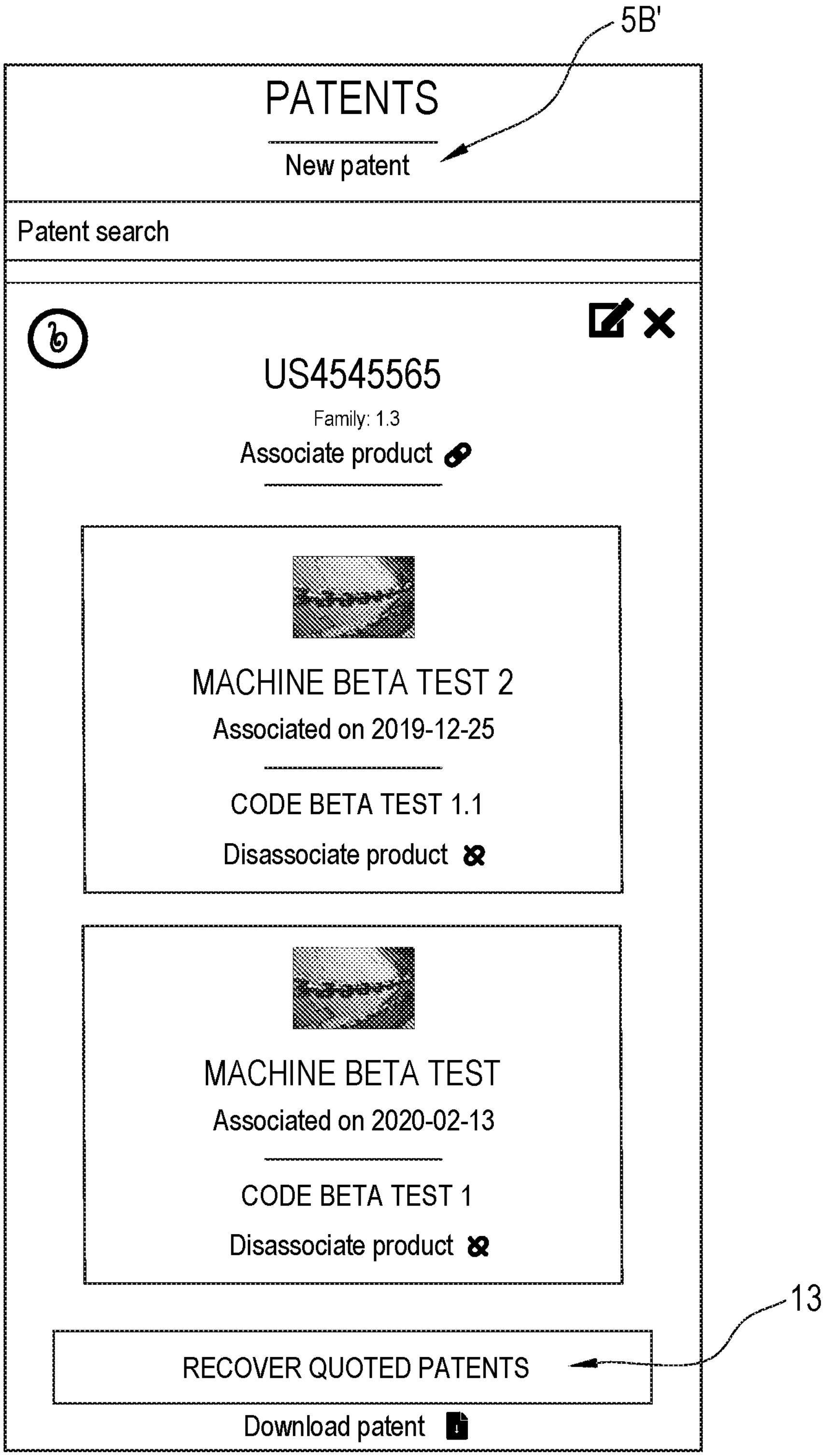
Figure 4:
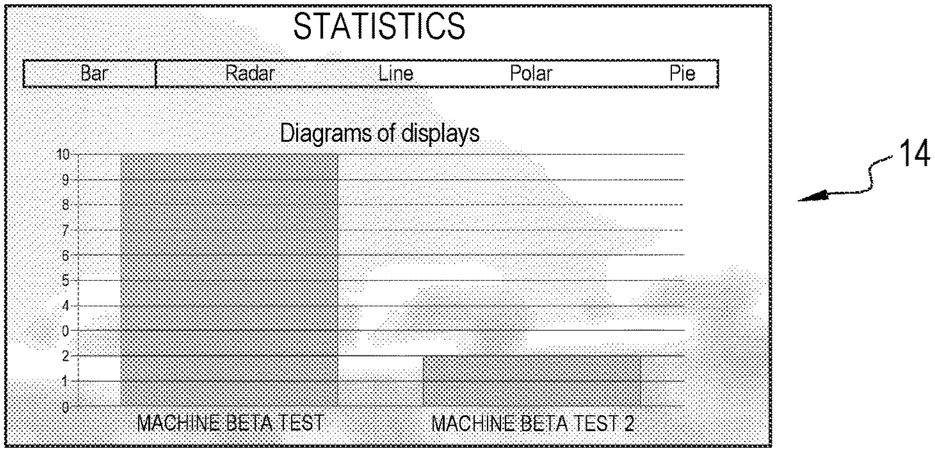
Figure 5:
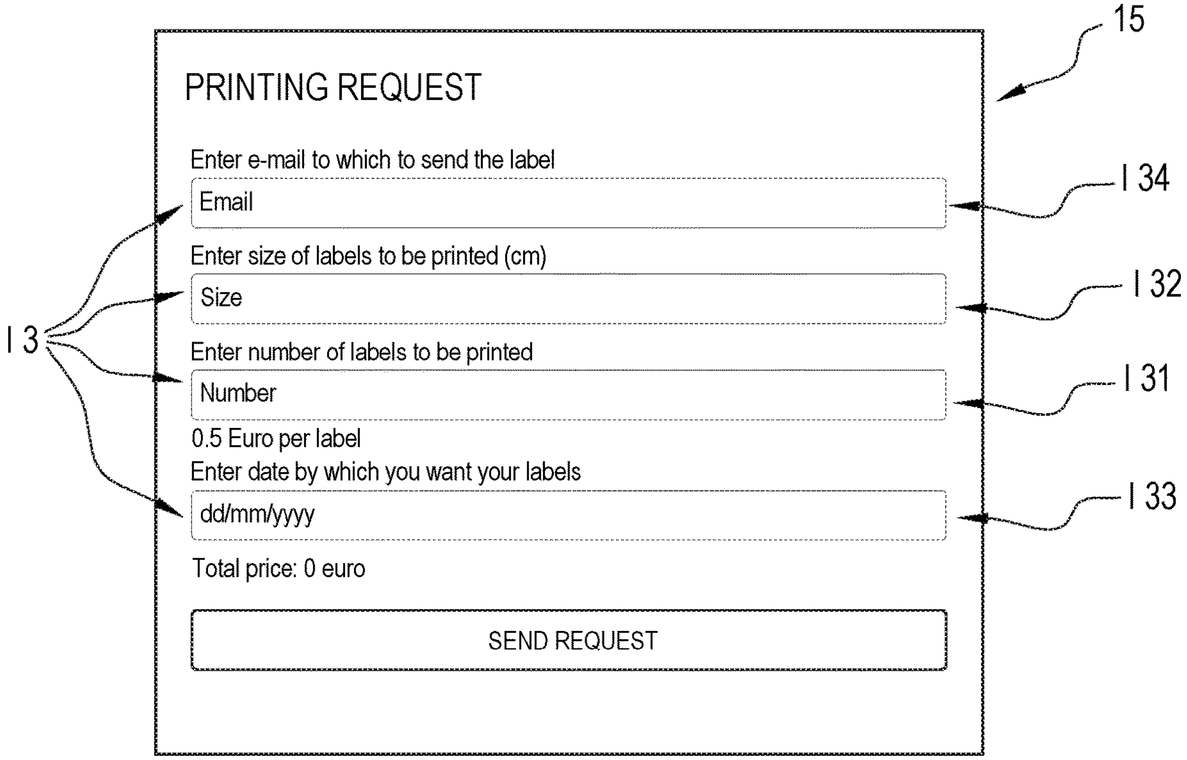
Figure 6:
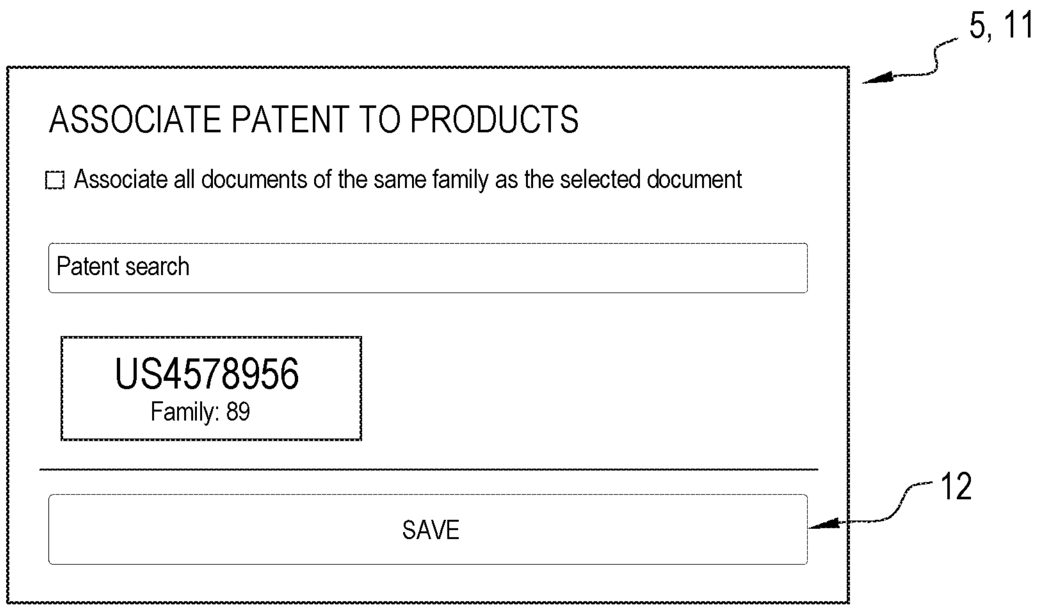
Figure 7:
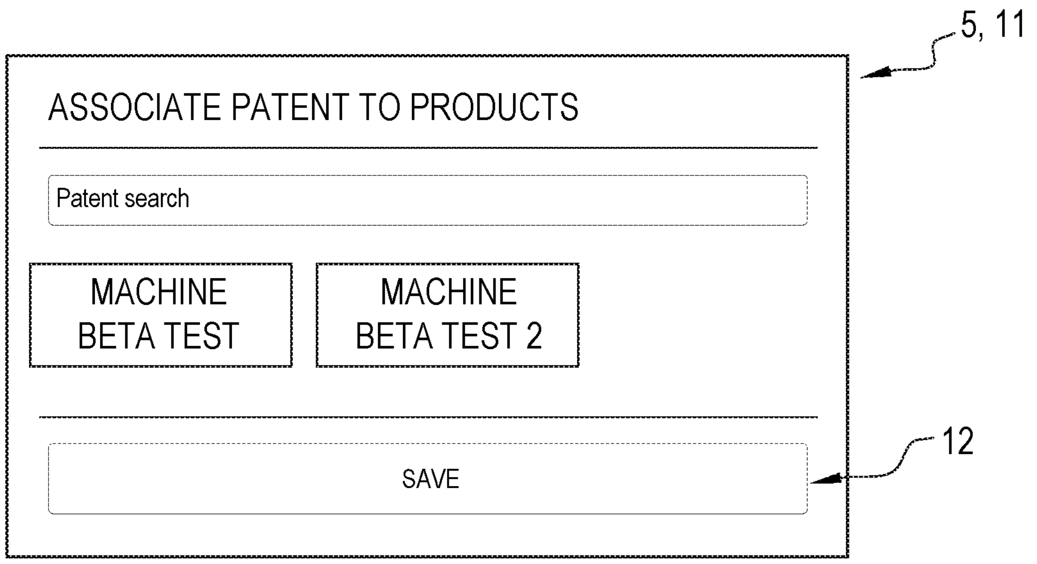
Figure 8:
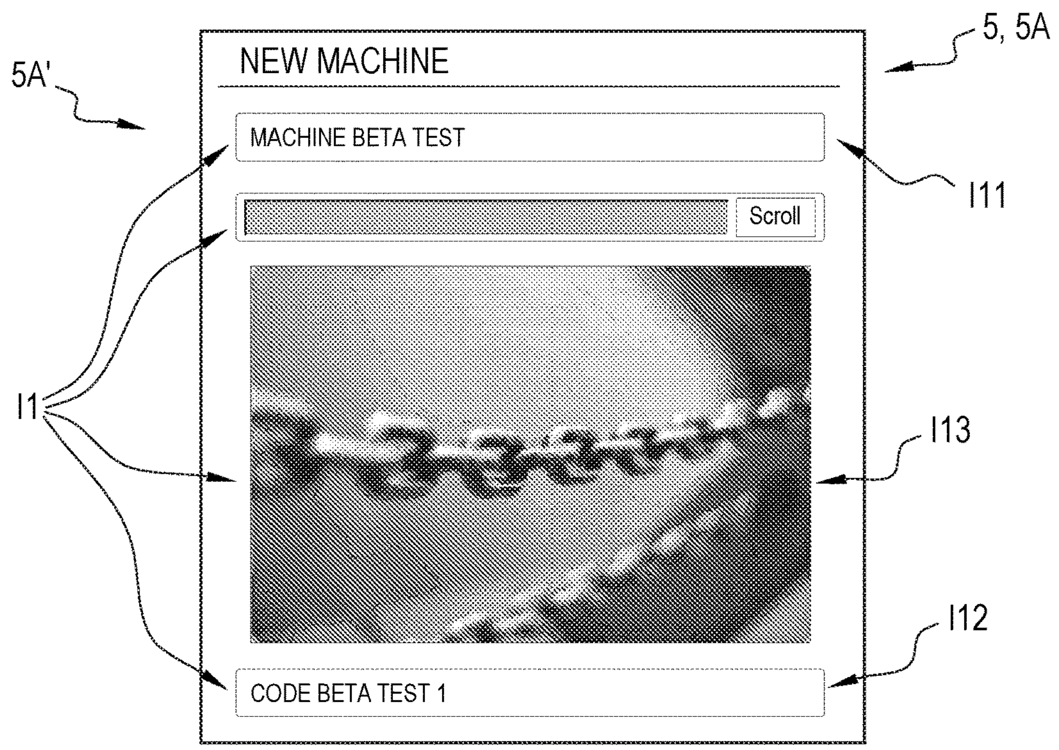
Figure 9:
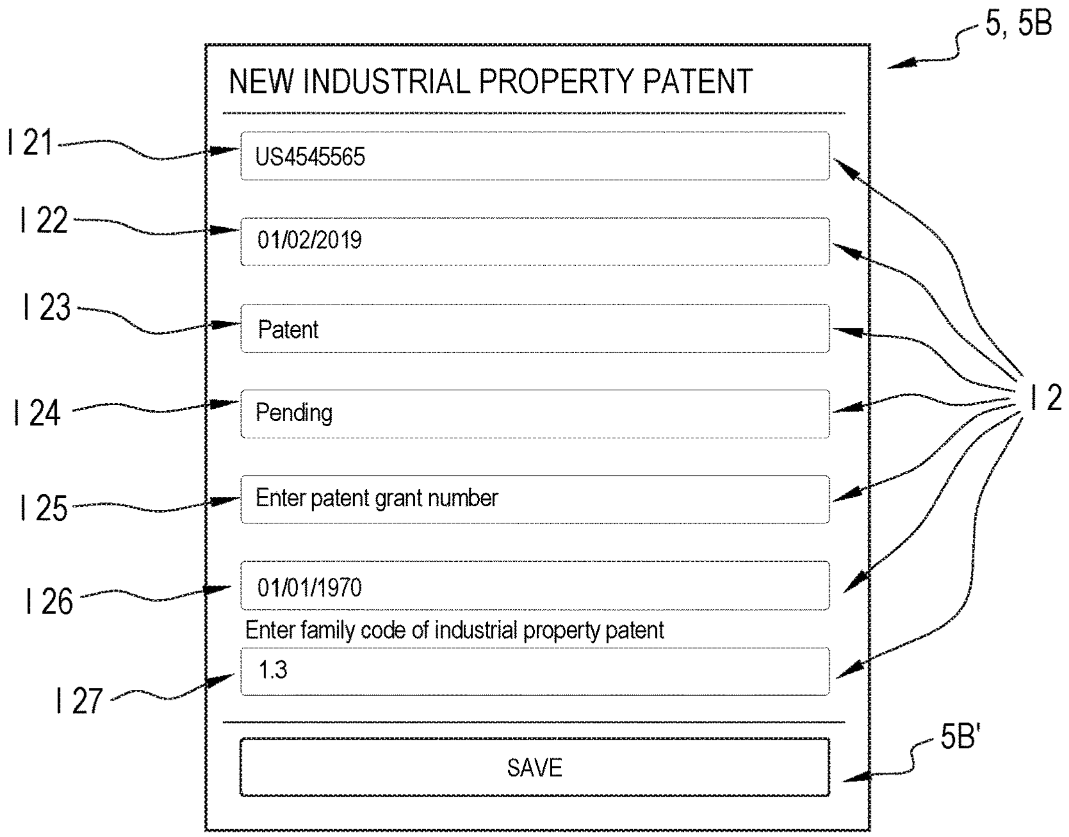

The system is shown in FIG. 1.

The system SL (for virtual product labelling) comprises, in combination:

first software operating instructions 3, configured to be executed by an electronic processor 4 to provide a user interface 5 defining:

a graphical module 5A for entering first information I1 associated with a "product" virtual entity, configured to allow the entry of said first information I1 by a user;

a graphical module 5B for the insertion of second information I2 associated with a "intellectual property rights" virtual entity, configured to allow the entry of said second information I2 by a user;

a graphical association module 11 configured to allow a user to select at least one "product" virtual entity and at least one "intellectual property rights" virtual entity for the purposes of their association; the first software operating instructions 3 being also configured to make available:

an association operating module 12 configured to associate with each other one or more of said "product" and "intellectual property rights" virtual entities on the basis of the selection made by means of the graphical association module 11;

an operational module 5A for generating a "product" virtual entity and storing said first information I1 entered through said graphical module 5A for entering first information I1;

an operating module 5B for generating a "intellectual property rights" virtual entity and storing said second information I2 entered through said graphical module 5B for entering second information I2;

a module 6 for generating an alphanumeric string 7, defining a URL type Internet address, which is unique for each "product" virtual entity;

a display module 3, accessible to the URL type Internet address and configured to generate, for each "product" virtual entity, information for displaying at least a part of the second information I2 relating to the "intellectual property rights" virtual entities associated with said "product" virtual entity.

It should be noted that the display module 3 makes it possible to provide a graphical information display.

Figure 10:
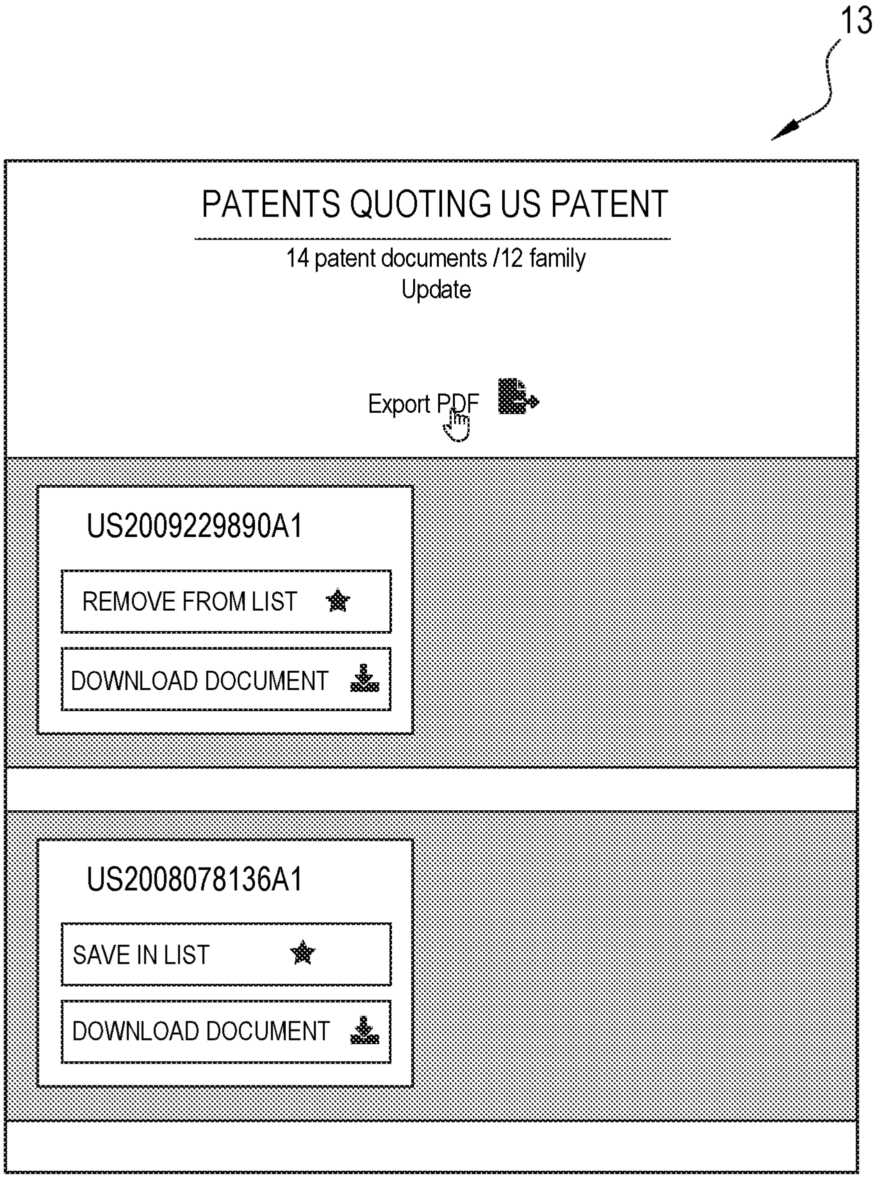
Figure 11:
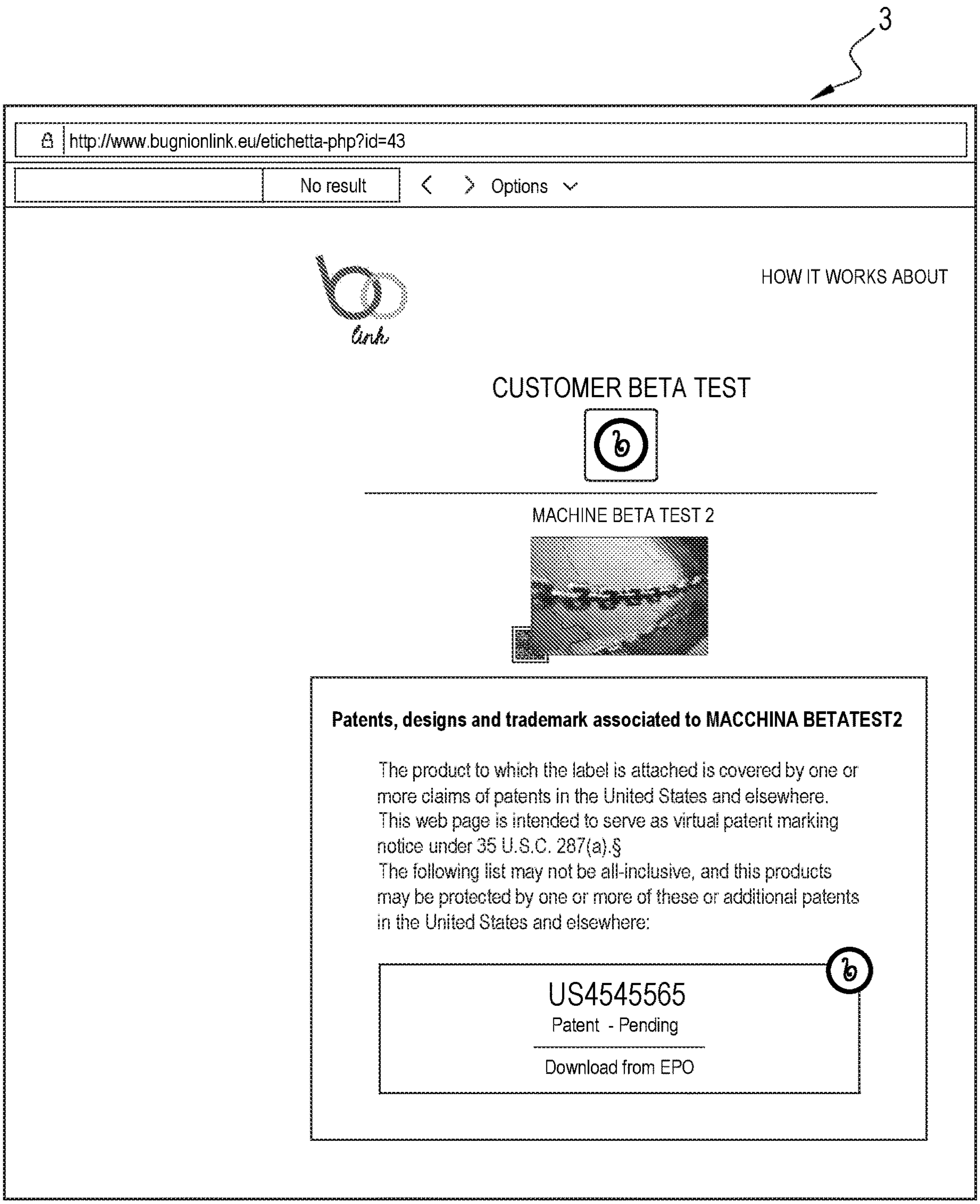
FIG. 11 illustrates a graphical-informative content made available by the system according to the invention to a predetermined Internet address.

The graphical information display is illustrated, by way of example, in FIG. 10, which shows the graphical content which would be displayed by accessing (by means of any electronic device, for example a PC or a smartphone) the Internet address defined by an alphanumeric string 7 related to a "product" virtual entity, that is to say, it shows the information provided by the display module 3.

"Product" virtual entity and "intellectual property rights" virtual entity means entities (information) generated by the software instructions, which can be stored in a permanent (or volatile) memory. For example, if the system SL comprises a database 2, the "product" virtual entity or "intellectual property rights" virtual entity is represented by a record (e,g. a line) of the database 2 (of a table of the database 2); the line includes the first and/or the second information I1 and I2.

Alternatively, the virtual entity is represented by a static file (e.g. HTML page) with content which cannot be modified (said content includes the first and/or the second information I1 and I2).

The term "module" in this description means a SW and/or HW element or a set of SW and/or HW elements.

According to an aspect, the system SL comprises a database 2.

The database 2 may be of any type, single or distributed.

The database 2 could also be a distributed ledger database, of any type.

According to this aspect, the operating module 5A for generating a "product" virtual entity, the operating module 5B for generating a "intellectual property rights" virtual entity and the association operating module 12 are configured for writing information in the database 2 and the display module 3 is configured for reading from the database 2 the display information of at least a part of the second information I2 regarding the "intellectual property rights" virtual entities associated with each "product" virtual entity.

In other words, the database 2 constitutes a container for storing (for saving and subsequent reading) the first information I1, the second information I2, and the association between the virtual "product" virtual entity and the "intellectual property rights" virtual entity selected and set by the user.

It should be noted that the proposed system SL advantageously allows a user to create a plurality of virtual entities and to associate them with industrial/intellectual rights, patented or not.

The association is extremely simple.

Moreover, at the Internet address defined by the alphanumeric string 7, anyone, using an electronic device (e.g. a smartphone 16*a*, a PC 16*b*) can display a graphical information content representing the industrial property rights associated with a certain "product" virtual entity.

In effect, as mentioned above, the string 7 is unique for each "product" virtual entity: this means that at the Internet address corresponding to a given string 7 it is possible to display the information previously associated with the "product" virtual entity to which the string 7 corresponds.

According to another aspect, the module 6 for generating an alphanumeric string 7 defining a URL type Internet address is configured to generate an alphanumeric string 7 comprising a first portion 7A of alphanumeric string comprising a predetermined Internet address, shared by all the "product" virtual entities, and a second portion 7B of unique alphanumeric string for each "product" virtual entity.

Basically, the alphanumeric string 7 comprises two parts: an initial portion 7A shared by all the "product" virtual entities and a unique final portion 7B for each "product" virtual entity.

This advantageously makes it possible to use a same physical storage space (electronic server) for the operation of the system SL, in which physical space differentiates the information content for each "product" virtual entity through the unique final portion 7B.

In other words, advantageously, the system SL is thus extremely simplified, since it is possible to use a single physical space (that is, a single network resources) as the base for storage.

According to another aspect, the module 6 for generating an alphanumeric string 7 is configured for generating a digital image ID containing the alphanumeric string 7.

Said digital image may be of any size and type (e.g. jpg, tiff, bmp, etc.).

According to another aspect, said digital image ID comprises a Q-R code, which codes the alphanumeric string 7.

Advantageously, the Q-R code can be acquired using any image acquisition device (e.g. a smartphone 16A, tablet, PC 16B, etc.) to allow it to be addressed to the Internet address corresponding to the alphanumeric string 7 in a particularly fast and simple manner.

More specifically, the image acquisition device (e.g. smartphone 16A, tablet, PC 16B, etc.) is directed, following acquisition of the Q-R code, to the Internet address corresponding to the alphanumeric string 7 in a particularly fast and simple manner.

According to another aspect, the association operating module 12 is configured for generating, for each "product" entity generated, an electronic file containing at least a part of the second information I2 relative to the "intellectual property rights" entities associated with the "product" entity.

According to an aspect, said electronic file consists of a static HTML page or a dynamic HTML page.

It should be noted that the static or dynamic HTML page is positioned at the Internet address defined by the alphanumeric string 7.

According to another aspect, the graphical module 5A for entering first information I1 is configured to allow entering one or more of the following items of information:

- an alphanumeric code I11 defining a name of said "product" virtual entity;
- an alphanumeric code I12 defining a product code associated with said "product" virtual entity;
- an image I13 representing said "product" virtual entity;
- a date defining the date of first marketing of a physical object of which said "product" virtual entity is representative in a predetermined territory.

It should be noted that the first items of information I1 make it possible to identify a physical product.

According to another aspect, the graphical module 5B for entering second information I2 is configured to allow entering one or more of the following said second items of information I2:

- a unique identification alphanumeric code I21 of said "intellectual property rights";
- a filing date I22 of said "intellectual property rights";
- a type I23 of "intellectual property rights";
- a legal status I24 of the "intellectual property rights";
- a unique alphanumeric code I25 identifying a granting of said "intellectual property rights";
- a date of the granting I26 of said "intellectual property rights";
- an alphanumeric code I27 identifying a family of the "intellectual property rights".

It should be noted that the second items of information I2 allow unique identification of the intellectual property rights and/or its legal status.

According to another aspect, the graphical association module 11 is configured to allow the setting of an association between "intellectual property rights" virtual entities and "product" virtual entities selected according to a "visible" mode or an "invisible" mode.

According to this aspect, the display module 3 is configured to exclude from the display information of a "product" virtual entity the second information I2 relating to the "intellectual property rights" associated in "invisible" mode with said "product" virtual entity and to include in the generation of display information of a "product" virtual entity the second information I2 regarding the "intellectual property rights" associated in "visible" mode with said predetermined "product" virtual entity.

In other words, accessing the Internet address corresponding to the alphanumeric string 7, according to the above-mentioned aspect, only the second information I2 relating to the "intellectual property rights" virtual entities which have been associated in visible mode are visible, whilst the second information I2 relative to the "intellectual property rights" virtual entities which have been associated in invisible mode are excluded from the display.

This possibility of selecting the mode of association, between visible and invisible, advantageously makes it possible to keep track of the association between certain intellectual property rights and products, but to exclude them from the display (this applies in many cases, to guarantee the confidentiality of the association established).

According to another aspect, the first software operating instructions 3 are configured to also provide a statistical module 14, configured for displaying statistics for access to said Internet address corresponding to the alphanumeric string 7.

According to an aspect, the access statistics comprise a value of a total number of accesses to said Internet address corresponding to the alphanumeric string 7.

According to another aspect, the statistical module 14 is configured to generate graphs for displaying the total number of accesses to said Internet address corresponding to the alphanumeric string 7, preferably charts of the "bar", "radar", "linear", "polar", "pie" type.

This allows, advantageously, a user to display the access/display statistics of a "product" virtual entity to which an alphanumeric string 7 is associated, corresponding to a potential interest for said product.

Advantageously, the statistical module 14 is of particular interest for the commercial function.

According to another aspect, the first software operating instructions 3 are configured to also provide a module 15 for printing a label, configured for transmitting to a desired electronic address, preferably of the email type, printing information of said label comprising the alphanumeric string 7.

Said printing information I3 comprises one or more of the following items of information:

- printing information I3, comprising one or more of the following items of information:
- a quantity I31 of physical labels to be printed;
- a dimension I32 of the labels;
- a delivery date I33 of said labels;
- an electronic dispatch address I34, preferably e-mail, to which to send at least a part of said printing information I3.

In this way, advantageously, it is possible to send to an electronic address information to be able to print a physical label to be applied to the product.

According to another aspect, in fact, the SL system comprises a physical support 8, on which is marked the alphanumeric string 7 defining a URL type address.

According to another aspect, the term "patent" or "pat" or "patent pending" is also marked on the physical support 8.

According to another aspect, said physical support 8 comprises a Q-R code, which codes the alphanumeric string 7.

According to another aspect, the association operating module 12 is configured for storing, at a predetermined date and/or at predetermined events, in a remote archive, marked in terms of time, a graphical-informative content relating to the at least a part of said second information I2 regarding the "intellectual property rights" virtual entities stored in association with the above-mentioned "product" virtual entity and visible at the Internet address corresponding to said alphanumeric string 7.

In practice, the association operating module 12 saves the graphical information content visible at the Internet address corresponding to the alphanumeric string 7 in a remote archive equipped with a time marking system, allowing the task of proving what was the graphical-information content to be carried out in the future at a predetermined date.

According to another aspect, the first instructions are configured to make available a module 13 for interrogating an on-line patent database, configured to interrogate said on-line patent data database (e.g. espacenet) and to extract patent documents referring to the "intellectual property rights" virtual entities identified from the second information I2.

The module is illustrated in FIG. 10.

The term "patent documents referring to" means the patent documents which include, in the search report or in the examination procedure, the "intellectual property rights" virtual entity identified by the second information I2.

According to another aspect, the display module 3 can be activated following an access to said URL type Internet address and is configured for:

- interrogating the database 2 to extract information regarding "intellectual property rights" virtual entities which are associated with the "product" virtual entity associated with said alphanumeric string 7/internet address of the URL type;
- extracting the results of the interrogation, that is, returning to the user a list of second information I2 relating to the "intellectual property rights" virtual entity which are associated with said "product" virtual entity in the database (2).

The user can display the results of said interrogation on any computer, notebook, smartphone, tablet etc.

In practice, the user can display the second information I2 relating to the "intellectual property rights" virtual entities.

Further, the display module 3 is configured for transmitting, together with the second information I2, a string comprising the wording "This web page is intended to serve as virtual patent marking notice under 35 U.S.C. § 287(a)" for a relative display.

It should be noted that, advantageously, the system SL allows virtual labels to be generated for the industrial property sector in a particularly simple and fast manner: in fact, it is possible to generate "product" virtual entities and "intellectual property rights" virtual entities in a particularly quick and easy manner, by entering the first and second information I1 and I2.

Moreover, through the system SL, it is possible for a user to always keep up-to-date the status of the intellectual property rights associated with his/her products: the physical label is in fact replaced by a virtual labelling and at the URL type Internet address associated with the relative product it is possible to display the list of intellectual property rights with their updated legal status.

The updating can be performed in an extremely simple and fast manner: in fact, it is sufficient to modify, for example through the user interface 5, the second information I2 stored in the database 2.

This avoids considerable management costs for the user, due to physical replacement of the physical labels, and considerably reduces the management complexity of the labelling.

Moreover, by providing a physical support 8 on the product bearing the alphanumeric string 7 or by printing it on the packaging of the product the alphanumeric string 7 it is possible to set up a virtual labelling system, wherein all the information of interest for the product (in particular, information relating to the associated intellectual property rights) can be traced at the predetermined Internet address.

The invention also provides a method (for virtual labelling), comprising the following steps:

- preparing an electronic processor 4 equipped with a user interface 5 accessible through an electronic communication network (e.g. Internet);
- generating at least one "product" virtual entity;
- entering, using said user interface 5, first information I1 associated with said "product" virtual entity and storing said first information I1;
- generating at least one "intellectual property rights" virtual entity;
- entering, by means of said user interface 5, second information I2 associated with said "intellectual property rights" virtual entity and storing said second information I2;
- establishing an association, by means of the user interface 5, between at least one "intellectual property rights" virtual entity and at least one "product" virtual entity and storing said established association;
- generating an alphanumeric string 7 defining a unique URL type Internet address for each "product" virtual entity;
- providing, as a result of an access to said URL type Internet address, at least a part of said second information I2 regarding the "intellectual property rights" virtual entities stored in association with the above-mentioned "product" virtual entity.

It should be noted that the method described above allows the generation of virtual labels.

Said method is actuated by at least one computer 4, or server 4.

According to another aspect, the step of generating an alphanumeric string 7 defining said URL type Internet address comprises the steps of:

- preparing a first portion 7A of alphanumeric string shared by all the "product" virtual entities;
- generating a second portion 7B of unique alphanumeric string for each "product" virtual entity;
- joining the second portion 7B of string to the first portion 7A of string, with said second portion 7B of string positioned at the rear of the first portion 7A of string, so as to make up the above-mentioned alphanumeric string 7 of the URL type.

According to another aspect, a step of generating, for each "product" virtual entity, an electronic file containing the second information (I2) relative to the "intellectual property rights" virtual entities associated with the "product" virtual entity and a step of storing said electronic file at a storage space accessible to said URL type Internet address.

According to another aspect, said electronic file consists of an HTML page.

According to yet another aspect, said electronic file consists of a dynamic HTML page.

According to another aspect, the step of entering, using said user interface 5, first information I1 associated with said "product" virtual entity comprises entering one or more of the following items of information:

- an alphanumeric code defining a name of said "product" virtual entity;
- an alphanumeric code defining a product code associated with said "product" virtual entity;
- an image depicting said "product" virtual entity;
- a date defining the date of first marketing of a physical object of which said "product" virtual entity is representative in a predetermined territory.

According to a further aspect, the step of entering, by means of said user interface 5, second information I2 associated with said "intellectual property rights" virtual entity comprises entering one or more of the following items of information:

- a unique identification alphanumeric code of said "intellectual property rights";
- a filing date of said "intellectual property rights";
- a type of "intellectual property rights";
- a legal status of the "intellectual property rights";
- a unique alphanumeric code identifying a granting of said "intellectual property rights";
- a date of the granting of said "intellectual property rights";
- an alphanumeric code identifying a family of the "intellectual property rights".

According to yet another aspect, the step of associating, by means of the user interface 5, at least one "intellectual property rights" virtual entity to at least one "product" virtual entity and storing said association executed comprises a step of setting up an association between the at least one "intellectual property rights" virtual entity and the at least one "product" virtual entity according to a "visible" or "invisible" mode.

According to this aspect, in the step of providing, as a result of an access to said URL, at least a part of said second information I2 regarding the "intellectual property rights" virtual entities stored in association with the above-mentioned "product" virtual entity only the second information I2 is provided corresponding to the "intellectual property rights" virtual entities associated in the "visible" mode to the "product" virtual entity and the second information I2 is not provided (hidden) corresponding to the "intellectual property rights" virtual entities associated in the "invisible" mode to the "product" virtual entity.

According to yet another aspect, the method comprises a step of interrupting an association, by means of the user interface 5, between at least one "intellectual property rights" virtual entity and at least one "product" virtual entity, with said association being established previously.

According to yet another aspect, the method comprises a step of storing, as a result of an access to said URL type Internet address, information for access to said URL type Internet address.

According to an aspect, the access information comprises a value indicating accesses to said URL type Internet address.

According to another aspect, the method comprises a step of generating a digital image, containing said alphanumeric string 7 defining a URL type Internet address.

According to another aspect, the method comprises a step of entering printing information, comprising one or more of the following items of information:

a quantity of physical labels to be printed;
a dimension of the labels;
a delivery date of said labels;
an electronic dispatch address, preferably e-mail, to which to send said information.

Preferably, the method also comprises a step of sending said digital image and said printing information to the electronic dispatch address.

According to another aspect, the method comprises a step of storing in a remote archive a graphical-informative content concerning the at least a part of said second information I2 regarding the "intellectual property rights" virtual entities stored in association with the above-mentioned "product" virtual entity, said graphical-informative content being visible as a result of an access to said URL type Internet address.

According to another aspect, the method comprises a step of preparing a physical support 8, on which the wording "patent" or "pat" or "patent pending" is marked (in any language, preferably English) and the alphanumeric string 7 defining a URL type Internet address.

According to another aspect, said physical support 8 comprises a Q-R code, which codes the alphanumeric string 7 defining a URL type Internet address.

The invention also relates to a computer product which can be loaded in a memory of at least one calculator 4 and comprising portions of software code for performing the steps of the method described above.

The invention claimed is:

1. A method actuated by an electronic processor equipped with a user interface accessible through a communication network, comprising the following steps:
generating at least one "product" virtual entity;
entering, using said user interface, first information associated with said "product" virtual entity and storing said first information;
generating at least one "intellectual property rights" virtual entity;
entering, by said user interface, second information associated with said "intellectual property rights" virtual entity and storing said second information;
establishing an association, by the user interface, between at least one "intellectual property rights" virtual entity and at least one "product" virtual entity and storing said established association;
generating an alphanumeric string defining a unique URL Internet address for each "product" virtual entity;
providing, as a result of an access to said URL Internet address, at least a part of said second information regarding the "intellectual property rights" virtual entities stored in association with the "product" virtual entity;
storing, at a predetermined date and/or at predetermined events, in a remote archive, marked in terms of time, a graphical-informative content relating to the at least a part of said second information regarding the "intellectual property rights" virtual entities stored in association with the "product" virtual entity and being visible as a result of the access to the URL Internet address;
the second information comprising an expression stating "virtual patent marking notice under 35 U.S.C. § 287 (a)" for a relative display; and
the second information comprising an information regarding a legal status of the "intellectual property rights".

2. The method according to claim 1, wherein the step of generating an alphanumeric string defining said URL Internet address comprises the steps of:
preparing a first portion of alphanumeric string shared by all the "product" virtual entities;
generating a second portion of unique alphanumeric string for each "product" virtual entity;
joining the second portion to the first portion, with said second portion positioned at a rear of the first portion, to make up the URL Internet address.

3. The method according to claim 1, comprising a further step of generating, for each "product" virtual entity, an electronic file containing the second information relative to the "intellectual property rights" virtual entities associated with the "product" virtual entity and a step of storing said electronic file at a storage space accessible to said URL Internet address.

4. The method according to claim 3, wherein said electronic file consists of a Hypertext Markup Language (HTML) page.

5. The method according to claim 3, wherein said electronic file consists of a dynamic Hypertext Markup Language (HTML) page.

6. The method according to claim 1, wherein the step of entering, using said user interface, first information associated with said "product" virtual entity comprises entering one or more of the following items of information:
an alphanumeric code defining a name of said "product" virtual entity;
an alphanumeric code defining a product code associated with said "product" virtual entity;
an image depicting said "product" virtual entity;
a date defining a date of first marketing in a predetermined territory of a physical object of which said "product" virtual entity is representative.

7. The method according to claim 1, wherein the step of entering, by said user interface, second information associated with said "intellectual property rights" virtual entity comprises entering one or more of the following items of information:
a unique identification alphanumeric code of said "intellectual property rights";
a filing date of said "intellectual property rights";
a type of "intellectual property rights";
a legal status of the "intellectual property rights";
a unique alphanumeric code identifying a granting of said "intellectual property rights";
a date of the granting of said "intellectual property rights";
an alphanumeric code identifying a family of the "intellectual property rights".

8. The method according to claim 1, comprising a further step of interrupting the established association, between at least one "intellectual property rights" virtual entity and at least one "product" virtual entity.

9. The method according to claim 1, comprising a further step of storing, as a result of the access to said URL Internet address, information for the access to said URL Internet address.

10. The method according to claim 9, wherein the information for the access comprises a value indicating a number of accesses to said URL Internet address.

11. The method according to claim 1, comprising a further step of generating a digital image, containing said alphanumeric string defining the URL Internet address.

12. The method according to claim 11, comprising a further step of entering printing information, comprising one or more of the following items of information:

a quantity of physical labels to be printed;

a dimension of the labels;

a delivery date of said labels;

an electronic dispatch address, to which to send said printing information;

and also comprising a further step of sending said digital image and said printing information to the electronic dispatch address.

13. The method according to claim 1, comprising a further step of preparing a physical support, on which the wording "patent" or "pat" or "patent pending" is marked and the alphanumeric string defining the URL Internet address.

14. The method according to claim 13, wherein said physical support comprises a Quick Response (Q-R) code, which codes the alphanumeric string defining the URL Internet address.

15. A system, comprising, in combination:

first software operating instructions, configured to be executed by an electronic processor to provide a user interface defining:

a graphical module for entering first information associated with a "product" virtual entity, configured to allow entry of said first information by a user;

a graphical module for entering second information associated with an "intellectual property rights" virtual entity, configured to allow entry of said second information by a user;

a graphical association module configured to allow a user to select at least one "product" virtual entity and at least one "intellectual property rights" virtual entity for purposes of an association therebetween; the first software operating instructions being also configured to make available:

an association operating module configured to associate with each other one or more of said "product" and "intellectual property rights" virtual entities based on a selection made by the graphical association module;

an operational module for generating a "product" virtual entity and storing said first information entered through said graphical module for entering first information;

an operating module for generating an "intellectual property rights" virtual entity and storing said second information entered through said graphical module for entering second information;

a module for generating an alphanumeric string, defining a URL Internet address, which is unique for each "product" virtual entity;

a display module, accessible to the URL Internet address and configured to generate, for each "product" virtual entity, information for displaying at least a part of the second information relating to the "intellectual property rights" virtual entities associated with said "product" virtual entity;

wherein the association operating module is configured for storing, at a predetermined date and/or at predetermined events, in a remote archive, marked in terms of time, a graphical-informative content relating to the at least a part of said second information regarding the "intellectual property rights" virtual entities stored in association with the "product" virtual entity and visible at the Internet address corresponding to said alphanumeric string;

the second information comprising an expression stating "virtual patent marking notice under 35 U.S.C. § 287 (a)" for a relative display; and the second information comprising an information regarding a legal status of the "intellectual property rights".

16. The system according to claim 15, further comprising a database and wherein the operating module for generating the "product" virtual entity, the operating module for generating the "intellectual property rights" virtual entity and the association operating module are configured for writing information in the database and the display module is configured for reading from the database the display information of at least a part of the second information regarding the "intellectual property rights" virtual entities associated with each "product" virtual entity.

17. The system according to claim 15, wherein the module for generating the alphanumeric string is configured to generate the alphanumeric string comprising a first portion of alphanumeric string comprising a predetermined Internet address, shared by all the "product" virtual entities, and a second portion of unique alphanumeric string for each "product" virtual entity.

18. The system according to claim 15, wherein the module for generating the alphanumeric string is configured for generating a digital image containing the alphanumeric string.

19. The system according to claim 18, wherein said digital image comprises a Quick Response (QR) code, which codes said alphanumeric string.

20. The system according to claim 15, wherein the association operating module is further configured for generating, for each "product" entity, an electronic file containing at least a part of the second information relative to the "intellectual property rights" entities associated with the "product" entity.

21. The system according to claim 20, wherein said electronic file consists of a static Hypertext Markup Language (HTML) page.

22. The system according to claim 20, wherein said electronic file consists of a dynamic Hypertext Markup Language (HTML) page.

23. The system according to claim 15, wherein the graphical module for entering first information is configured to allow entering one or more of the following items of information:

an alphanumeric code defining a name of said "product" virtual entity;

an alphanumeric code defining a product code associated with said "product" virtual entity;

an image depicting said "product" virtual entity;

a date defining a date of first marketing of a physical object of which said "product" virtual entity is representative in a predetermined territory.

24. The system according to claim 15, wherein the graphical module for entering second information is configured to allow entering one or more of the following said second items of information:

a unique identification alphanumeric code of said "intellectual property rights";

a filing date of said "intellectual property rights";

a type of said "intellectual property rights";

a legal status of the "intellectual property rights";

a unique alphanumeric code identifying a granting of said "intellectual property rights";

a date of the granting of said "intellectual property rights";

an alphanumeric code identifying a family of said "intellectual property rights".

25. The system according to claim 15, wherein the first software operating instructions are configured to also provide a statistical module, configured for displaying statistics for access to said URL Internet address corresponding to the alphanumeric string.

26. The system according to claim 15, wherein the first software operating instructions are configured to also provide a module for printing a label, configured for transmitting to a desired electronic address, printing information of said label comprising the alphanumeric string.

27. The system according to claim 26, wherein said printing information comprises one or more of the following items of information:

a quantity of physical labels to be printed;

a dimension of the labels;

a delivery date of said labels;

an electronic dispatch address, to which to send at least a part of said printing information.

28. The system according to claim 15, further comprising a physical support, on which is marked the alphanumeric string defining the URL Internet address.

29. The system according to claim 28, wherein the term "patent" or "pat" or "patent pending" is also marked on the physical support.

30. The system according to claim 28, wherein said physical support comprises a Quick Response (QR) code, which codes the URL Internet address.

31. The system according to claim 15, further comprising a statistical module, configured to make available statistics for access to said URL Internet address.

32. The system according to claim 15, wherein the first software operating instructions are configured to make available a module for interrogating an on-line patent database, configured to interrogate said on-line patent data database and to extract patent documents referring to the "intellectual property rights" virtual entities generated.

33. A method actuated by an electronic processor equipped with a user interface accessible through a communication network, comprising the following steps:

generating at least one "product" virtual entity;

entering, using said user interface, first information associated with said "product" virtual entity and storing said first information;

generating at least one "intellectual property rights" virtual entity;

entering, by said user interface, second information associated with said "intellectual property rights" virtual entity and storing said second information;

establishing an association, by the user interface, between at least one "intellectual property rights" virtual entity and at least one "product" virtual entity and storing said established association;

generating an alphanumeric string defining a unique URL Internet address for each "product" virtual entity;

providing, as a result of an access to said URL Internet address, at least a part of said second information regarding the "intellectual property rights" virtual entities stored in association with the "product" virtual entity;

wherein the step of establishing an association, by the user interface, at least one "intellectual property rights" virtual entity to at least one "product" virtual entity and storing said established association comprises a step of setting up an association between the at least one "intellectual property rights" virtual entity according to a "visible" or "invisible" mode, and wherein in the step of providing, as a result of the access to said URL, at least a part of said second information regarding the "intellectual property rights" virtual entities stored in association with the "product" virtual entity only the second information is provided corresponding to the "intellectual property rights" virtual entities associated in the "visible" mode to the "product" virtual entity and the second information is not provided corresponding to the "intellectual property rights" virtual entities associated in the "invisible" mode to the "product" virtual entity.

34. A system, comprising, in combination:

first software operating instructions, configured to be executed by an electronic processor to provide a user interface defining:

a graphical module for entering first information associated with a "product" virtual entity, configured to allow entry of said first information by a user;

a graphical module for entering second information associated with an "intellectual property rights" virtual entity, configured to allow entry of said second information by a user;

a graphical association module configured to allow a user to select at least one "product" virtual entity and at least one "intellectual property rights" virtual entity for purposes of an association therebetween; the first software operating instructions being also configured to make available:

an association operating module configured to associate with each other one or more of said "product" and "intellectual property rights" virtual entities based on a selection made by the graphical association module;

an operational module for generating a "product" virtual entity and storing said first information entered through said graphical module for entering first information;

an operating module for generating an "intellectual property rights" virtual entity and storing said second information entered through said graphical module for entering second information;

a module for generating an alphanumeric string, defining a URL Internet address, which is unique for each "product" virtual entity;

a display module, accessible to the URL Internet address and configured to generate, for each "product" virtual entity, information for displaying at least a part of the second information relating to the "intellectual property rights" virtual entities associated with said "product" virtual entity;

wherein the graphical association module is further configured to allow setting of an association between "intellectual property rights" virtual entities and "product" virtual entities selected according to a "visible" mode or an "invisible" mode, and wherein the display module is configured to exclude from the display information of a "product" virtual entity the second information relating to the "intellectual property rights" associated in "invisible" mode with said "product" virtual entity and to include in the display information of a "product" virtual entity the second information regarding the "intellectual property rights" associated in "visible" mode with said predetermined "product" virtual entity.

* * * * *